Figure 1:
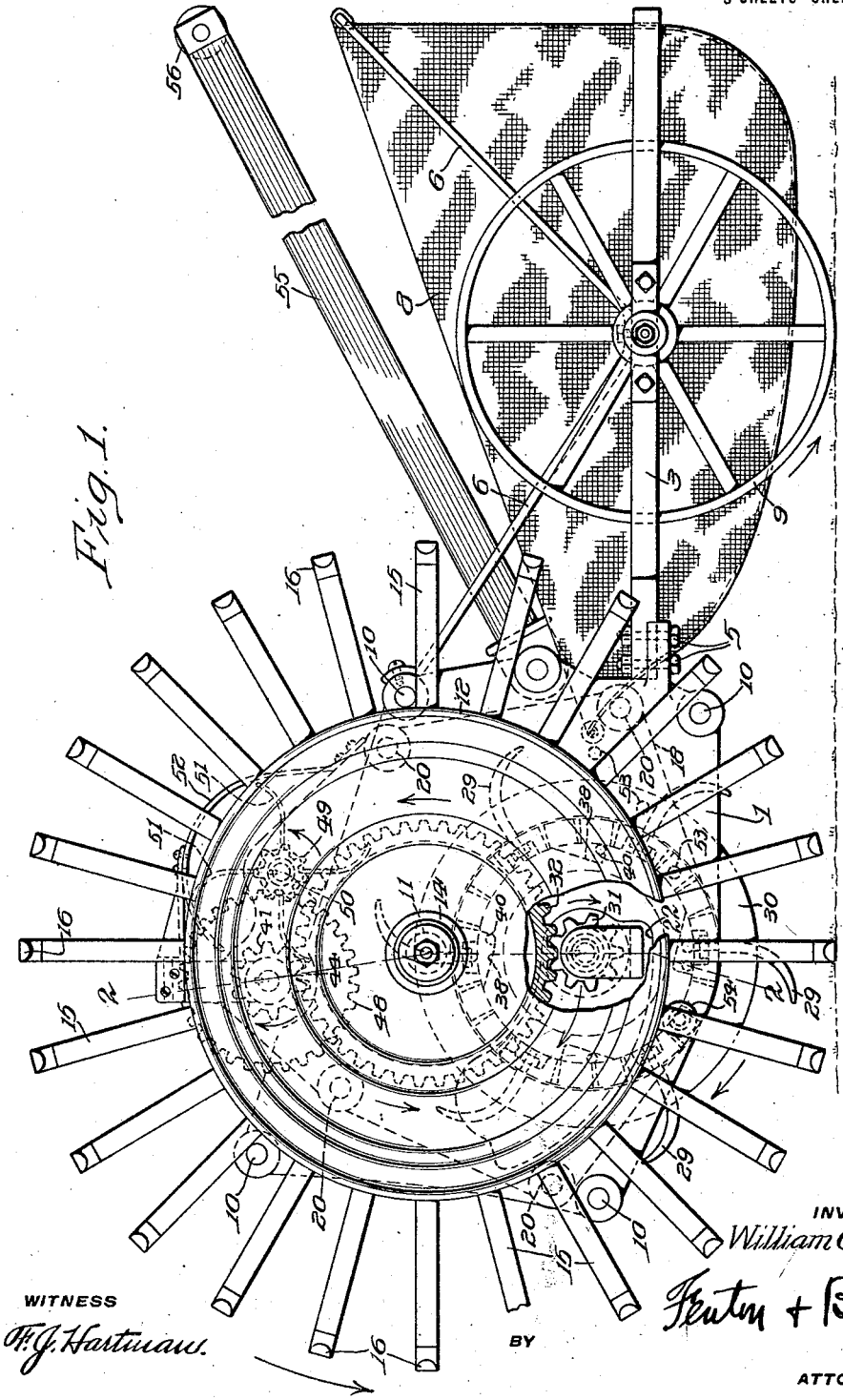

W. GRIFFIN.
BERRY HARVESTING MACHINE.
APPLICATION FILED FEB. 15, 1917.

1,277,715.

Patented Sept. 3, 1918.
3 SHEETS—SHEET 1.

WITNESS
F. J. Hartman.

INVENTOR
William Griffin.

BY Fenton + Blount

ATTORNEYS

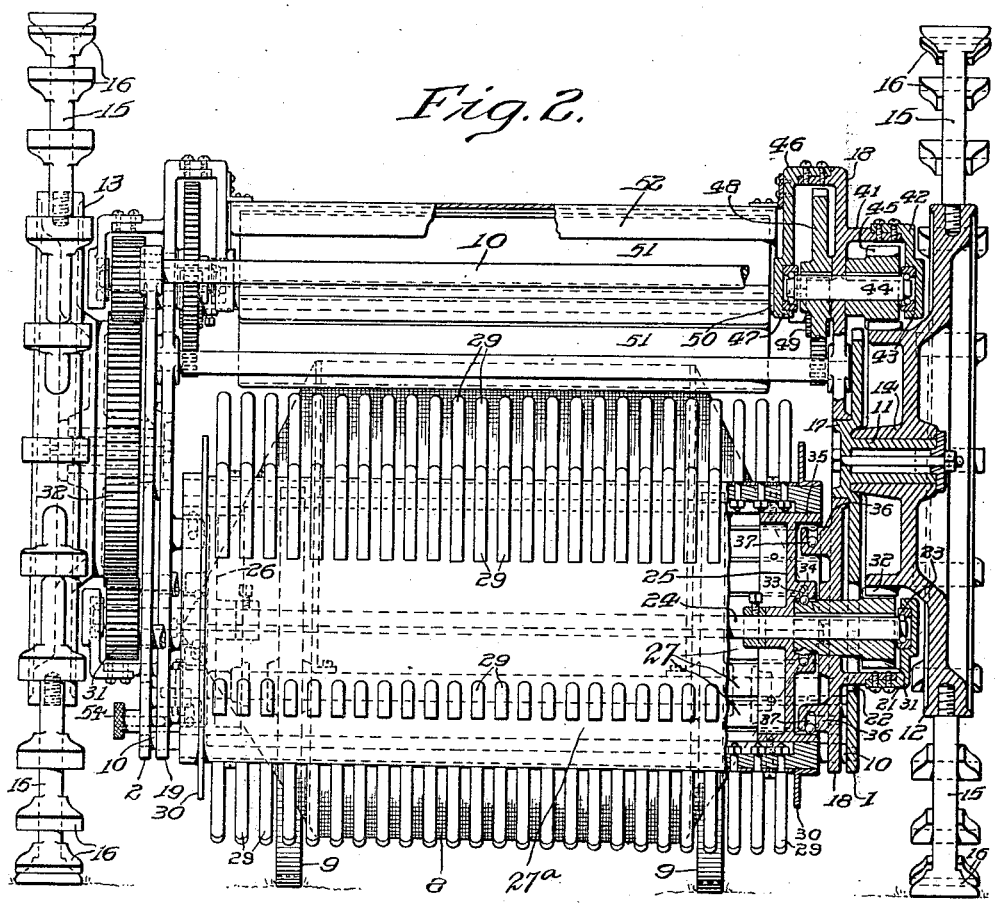

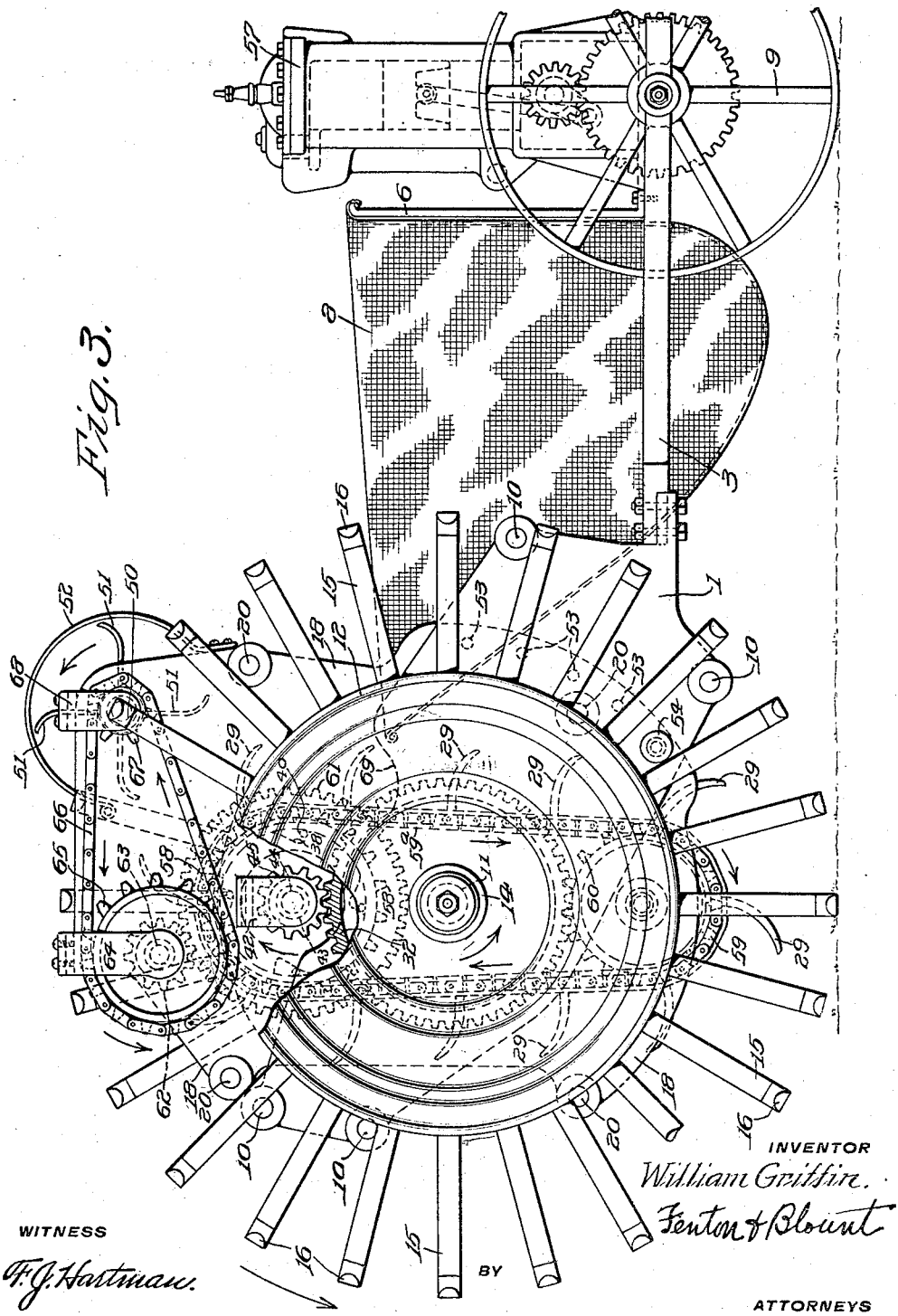

UNITED STATES PATENT OFFICE.

WILLIAM GRIFFIN, OF OCEAN GATE, NEW JERSEY.

BERRY-HARVESTING MACHINE.

1,277,715.

Specification of Letters Patent.

Patented Sept. 3, 1918.

Application filed February 15, 1917. Serial No. 148,720.

*To all whom it may concern:*

Be it known that I, WILLIAM GRIFFIN, a citizen of the United States, and a resident of Ocean Gate, county of Ocean, and State of New Jersey, have invented certain new and useful Improvements in Berry-Harvesting Machines, of which the following is a specification.

This invention relates to machines for harvesting, gathering or picking various kinds of berries, such as cranberries and the like, and has for its object to provide a machine of this character which will operate to sever various kinds of berries from the vines without unnecessarily injuring the vines or in any way bruising the berries which are being harvested and will deliver or collect the same into a suitable detachable receptacle in a rapid and efficient manner.

A further object of this invention is to provide a berry picking machine which may be adjusted for various heights of vines and thus is adapted for a wide range of use with all kinds of berries of the character indicated. Further objects of this invention are to provide in connection with the berry harvesting machine, a winnowing or fan attachment to separate dust, leaves, stems or other foreign matter from the berries as they are being picked so that the machine will operate to harvest and collect the berries in a suitable receptacle clear of dirt and free from any foreign matter.

Further objects of this invention are to provide a berry picking mechanism which is made to rotate by operatively mounting the device on a suitable truck-like device which is propelled over the ground and is provided at its forward end with a pair of rimless wheels having spokes or legs which may be moved over the berry vines without bruising, crushing or injuring the berries before they are picked or injuring the vines, while the rear wheels of the truck, if used, may be of the ordinary kind since these wheels pass over the vines after the berries have been picked.

Further objects of this invention are to provide in a machine of this character, a unidirectional clutch mechanism between the driving wheels of the truck and the picking mechanism combined with a brake, so that the picking mechanism will operate when the device is being pushed in one direction only and when the machine is pulled backward, this reverse movement will not operate to rotate the picker mechanism, which operation might otherwise result in injury to the device, the brake for the picker mechanism operating in combination with the clutch mechanism to prevent the picking mechanism from rotating reversely independently of the clutch controlling mechanism.

Further objects of this invention will be apparent from the specification and claims hereunto annexed and forming a part of this specification, reference also being had to the accompanying drawings in which Figure 1 is a side elevation of one form of my invention and Fig. 2 a section taken on line 2—2 of Fig. 1, while Fig. 3 represents a side elevational view similar to Fig. 1 of a modified form of my invention.

Referring to Figs. 1 and 2, it will be seen that this improved berry harvesting machine comprises a pair of stationary side plates 1 and 2 which are provided with a rearwardly extending frame member 3, the frame 3 being attached to the side plates 1 and 2 in any suitable manner as by the bolts 5 shown in Fig. 1. The frame 3 has secured thereto a receptacle or bag carrying frame 6 which extends forwardly and is secured to the side plates 1 and 2. The berry receptacle or bag 8 is detachably supported by the frame member 6. A pair of wheels 9 may be provided to support the frame 3 and are suitably journaled to the rearwardly extending portions of the frame members.

The stationary side plates 1 and 2 are connected together and braced by the transversely extending rods 10 to make a main stationary supporting frame, and each of the plates 1 and 2 is provided with a bearing 11 upon which is mounted the main driving wheels 12 and 13 of the harvesting machine which are of special construction and form one of the novel features of my invention. The driving wheels 12 and 13 are provided with hubs 14 which may be secured on the bearings 11 of the frames 1 and 2 in any convenient or suitable manner, such as that illustrated in Fig. 2. The driving wheels 12 and 13 are provided with a plurality of radially extending legs or spokes 15, clearly shown in Figs. 1 and 2 of the drawings, and may have enlarged ends 16 forming feet for the spokes. The main driving wheels when formed in this manner provide a mechanism which may be propelled over the ground covered by the berry vines without bruising the berries or matting or crushing or otherwise injuring the vines and at the same time form means for driving the berry picking mechanism in the manner hereinafter more specifically described.

The stationary side plates 1 and 2 may be provided with suitable inwardly extending bearings 17 which are adapted to form a pivotal supporting means for an inner movable pair of side plates 18 and 19. The inner side plates 18 and 19 are braced together by transverse rods 20 similar to the rods 10 which brace the outer side plates 1 and 2, which forms an outer stationary supporting frame or cage while the inner frame forms an auxiliary inner frame and serves as means for supporting the picking mechanism proper in the various adjusted positions to vary the height of the picking mechanism from the ground and also forms means for supporting a fan mechanism which forms a part of this invention and is also driven from the rimless driving wheels 12 and 13 above described. As more clearly shown in Fig. 2, the inner side frames 18 and 19 each have an outwardly extending bracket 21 passing through a slot 22 in the outer stationary plates 1 and 2, and the bracket 21 supports a ball bearing 23 which, in turn, carries the main shaft 24 of the berry picking mechanism. Loosely mounted on the shaft 24 are the end plates or heads 25 and 26 of the picking drum mechanism. These end plates support a plurality of longutudinal staves 27 which form, when covered with a suitable canvas 27ª, a drum-like structure which is designed to carry the berry picking fingers 29. An inspection of Figs. 1 and 2 will show that this mechanism constitutes in effect a drum-shaped member provided with any desired number of transverse rows of berry picker fingers 29 which are curved in a forward direction forming with the canvas surface of the drum, a trough-shaped rotating carrier for the berries after they have been picked from the vines. The surface of the drum may be provided at each end, if desired, with a shield or guard member 30 which operates to retain the berries in the trough-like arrangement formed by reason of a row of fingers across the surface of the drum-shaped carrier and thus prevents the berries from rolling longitudinally off of the edge of the drum.

In order to provide means for suitably rotating the drum picking mechanism, the main shaft 24 is provided at each end with a gear pinion 31 which is secured to the shaft 24 in any desirable manner, as by being keyed thereon. The slot 22 previously described is in the shape of an arc as shown in Fig. 1 and is sufficiently wide to permit the pinions 31 to extend through the stationary side plates 1 and 2 together with the supporting brackets 21 hereinbefore described. The driving wheels 12 and 13 are provided with driving gears 32 which mesh with the pinion 31 and rotate the same. As the gear pinions 31 are adapted to rotate the drum picking mechanism in one direction only, a ball clutch mechanism 33, shown in Fig. 2, is located between the pinion 31 and an outwardly extending hub 34 on the end plates 25 and 26 of the drum. The end plates 25 and 26 are also provided with a rim 35 and the plates 18 and 19 have inwardly extending flanges 36 so that suitable brake means may be provided for preventing the drum from rotating backward relatively to the frames 18 and 19 as by reason of the weight of the berries when the machine is stationary. To accomplish this result a suitable brake or clutch mechanism 37 is located in the rim or flange 35 and comprises ball races 38, arranged as shown in Fig. 1, and balls 40 located therein which operate in the manner well understood in the art to permit the drum picker mechanism to rotate freely in one direction but prevent rotation of the same in a reverse direction.

The fan mechanism above referred to which forms a feature of my improved berry picking mechanism, is also carried by the adjustable plates 18 and 19 and is operated from the driving hubs 12 and 13. For this purpose each of the plates 18 and 19 is provided with an outwardly extending bracket 41 having attached thereto a ball bearing supporting arm 42 carrying the ball bearing 43, each bracket on either end of the machine being designed to support a short shaft 44. Each of the shafts 44 is so mounted as to extend through the frames 18 and 19 and each carries at its outer end a spur gear 45 adapted to engage the driving gear 32 of the driving wheels 12 and 13. The plates 18 and 19 are also provided with an inwardly extending overhanging bracket 46 which carries a ball bearing 47 adapted to support the inner end of the short shaft 44 in a manner similar to that in which the other end of the shaft is supported by the ball bearing 43 in the arm 42. A gear 48 is keyed to each shaft 44 and conveniently located just inside the plates 18 and 19 as clearly shown in Fig. 2. The gears 48 mesh with suitable gears 49, the gear 49 on each end of the device being connected by a transverse shaft 50 which forms the shaft for the fan blades 51. These fan blades may be of any suitable construction and may be in the form of brushes if desired. A suitable casing 52 surrounds the fan blades and is provided with conveniently located openings to permit the dust and leaves or other foreign matter which is liable to be picked up with the berries by the curved fingers of the picking mechanism to be blown away from the receptacle into which the berries alone are deposited by the picker drum mechanism.

As shown in Fig. 1, the inner frames 18 and 19 are provided with a plurality of openings or recesses 53 while the stationary end plates 1 and 2 are provided with studs 54 which may be inserted into any one of the openings 53 in the frame plates 18 and 19 and thus hold the inner frame in various adjusted positions. The inner frame formed by the plates 18 and 19 and the connecting rods 20 carries the entire operative mechanism of the device and is pivoted on the hub 17 of the main stationary frame formed by the side plates 1 and 2 and bracing rods 10. It will be thus seen that the inner frame may be rotated about the hubs 17 as a pivot and may be secured in various positions by reason of the engagement of the stud 54 of the stationary side plates 1 and 2 with the recesses 53 and that this movement of the inner plates 18 and 19 operates to raise or lower the picker drum mechanism and thus permits the device to be adjusted so that the picker fingers 29 may be made to operate at any desired distance from the ground.

As shown in Fig. 1, the stationary side plates 1 and 2 are provided with upwardly and rearwardly extending handles or handle arms 55 and the two arms may be connected by a suitable transverse handle 56 adapted to be grasped by the operator in propelling the machine over the ground.

From the description of the mechanism it is thought that the operation of the machine will be readily understood. After the picker drum has been adjusted to the desired height, the machine is propelled over the vines in the manner indicated above and the driving wheels 12 and 13 rotated by the spokes 15, operate through the spur gear 31 and clutch mechanism 33 to rotate the drum carrying the picker fingers 29. The fingers engage underneath the berries and, severing the same from the vines, collect them in the trough formed by the picker fingers 29 and the cylindrical surface of the drum as heretofore described. As the berries are carried up over the surface of the drum by one set of fingers 29 and reach the rearward side of the same they will readily roll off the surface of the drum and, being guided by the upper or rear side of the adjacent set of fingers 29 ahead, will fall into the receptacle or bag 8 as will be apparent from the construction described above and shown in the drawings. The fan 50 is also operated from the gear 32 on the driving wheels 12 and 13 through the spur gear 45, shaft 44, driving gears 48 and 49. It will thus be seen that as the drum mechanism carries the berries, together with any dust, leaves or any other foreign matter collected with the berries or on the surface thereof, the fan mechanism operates to blow away the leaves and dust and permits the berries to drop into the receptacle 8 free from any dust, leaves, or foreign matter.

The clutch mechanism 33, as will be readily understood from the foregoing description permits the device to be drawn in the reverse direction without causing an actuation of the berry picking mechanism which might tend to injure the mechanism. Furthermore, this structure forms a differential driving mechanism which permits the efficient operation of the device when the machine is being turned around and thus one of the driving wheels 12 or 13 is operating faster or slower than the other. Furthermore, when the rear supporting wheels 9 were incidentally raised from the ground and the device turned sharply around the clutch mechanism 33 would permit one driving wheel 12 or 13 to rotate in the opposite direction from the other and would not cause any injury to the mechanism.

In the modification shown in Fig. 3 instead of the drum-shaped picker mechanism, I have provided a chain belt mechanism for carrying the curved fingers 29 instead of the drum shown in the modification of Figs. 1 and 2. Furthermore, in Fig. 3 is illustrated conventionally one way in which my improved berry picking machine may be driven by a suitable motor. The frames 1 and 2 shown in the modification of Fig. 3 are similar to the main frame members 1 and 2 of the drum type of machine illustrated in Figs. 1 and 2, and the end plate 1 is connected to the rearwardly extending frame member 3 which is supported by the rear wheels 9 in the same manner as before. A suitable motor 57 may be carried by the rear frame and operatively connected with the wheels 9 to form one means whereby the machine may be suitably propelled over the vines. The berry receptacle 8 is detachably held in a suitable frame structure 6 and the driving wheels 12 and 13 provided with the radial spokes 15 and feet 16 operate as the means for rotating the main gear 32 as in the modification shown in Figs. 1 and 2. In Fig. 3, the inner frame 18, connected by rods 20 to a similar frame 19 on the other end of the machine forms an inner carrying frame mechanism which is pivotally mounted in the outer stationary frame formed by the members 1 and 2 which are connected by the transverse rods 10. The inner frame is provided at each end with a bracket 42 designed to carry a ball bearing 43 which supports a shaft 44 on which is loosely mounted the pinion 45 adapted to be rotated by the main driving gear 32 on the driving wheel 12. The shaft 44 extends through the frame 18 to the other side of the machine and into the corresponding frame member 19. Just inside of each of the frames 18 and 19 the shaft 44 has secured thereto a gear 58, and the gears 58 are adapted to carry the link chains 59 which form means for supporting and carrying a wide endless belt structure 59ª having secured thereto the picker fingers 29. The belt 59ª corresponds to and operates in substantially the same manner as the drum form of picking mechanism shown in Figs. 1 and 2. The chains 59 located at each end of the machine pass over the upper sprockets 58 and the lower sprocket wheels 60 carried by the lower portion of each of the inner frames 18 and 19, the sprockets 60 being suitably journaled therein by an antifriction bearing.

The upper transverse shaft 44 has secured thereto adjacent the gear 58, a driving gear 61 operated by a unidirectional clutch 38 from the pinion 45. The large gear 61 is designed to mesh with a gear 62 secured to a shaft 63 which in turn is journaled in a suitable overhanging bearing 64 to the movable frame 18. The shaft 63 extends through the frame 18 and has secured to the outer end thereof a driving sprocket 65 which is connected by means of the sprocket chain 66 to a small sprocket gear 67 on the fan shaft 50, the sprocket 67 being suitably journaled in an overhanging bearing 68 on the movable frame 18, similar to the bracket 42 which supports the shaft 44.

The inner frames 18 and 19 of Fig. 3 are provided with a plurality of recesses 53 similar to the recesses 53 in the inner frame of Fig. 1, and the stationary frame 1 has a stud 54 extending into the recesses 53 to hold the inner movable frame in any desired position of adjustment. In this manner it will be seen that the curved fingers 29 which are operated by the sprocket chains 59, being secured to the endless belt 59ª, may be adjusted to various heights from the ground by reason of the rotational movement of the inner frames 18 and 19 around the axis of the driving wheels 12 and 13 as a pivot. In view of the fact that the lower sprocket 60 is located inside of the inner frame and does not extend through the outer frame as does the driving pinion 31 of the preferred form of the invention shown in Fig. 2, it is unnecessary to provide the outer frame 1 in Fig. 3 with the slot 22 of Figs. 1 and 2. The upper surface or edge of the stationary main frame members 1 and 2 of Fig. 3, is cut away in the manner indicated at 69 to permit the movement of the driving pinion 45 when the inner frame construction is adjusted relatively to the stationary frame members 1 and 2 to regulate the height of the picker fingers 29 from the ground.

The operation of the modification shown in Fig. 3 being substantially the same as that shown in Figs. 1 and 2, it is thought that the same will be readily understood from the description thereof. The machine shown in Fig. 3 may be substantially larger transversely than that shown in Figs. 1 and 2 and may be propelled by the motor 57 as will be readily understood. The height of the fingers 29 from the ground is adjusted by the stud 54 being inserted in any one of recesses 53 of the inner frame 18. The machine is propelled over the ground by the motor 57 and as the spokes 15 move over the ground the wheels on each side of the machine rotate therewith and operate the driving gears 32 carried thereby, which in turn rotate the pinion 45, clutch 38, driving gear 61, shaft 44 and sprocket 58. The sprocket 58, as it rotates, moves the link chain 59 and consequently the endless belt carrying the picker fingers 29 moves therewith and the fingers 29 sever the berries from the vines and carry the same on the surface of the endless belt 59ª of the picking mechanism and up over the upper shaft 44 in a manner similar to that in which the berries are carried by the drum mechanism of Figs. 1 and 2. The driving gear 61 on the shaft 44 rotates the pinion 62 which carries the sprocket shaft 63 and thus operates the driving chain 65 to rotate the fan shaft 50 as in the other modification. The fan operates to remove any dust, leaves or foreign matter from the berries as they come over the upper shaft 44 and upon descending on the rearward side of the endless belt mechanism the berries roll off the surface of the belt and onto the upper or rearward side of the curved picker fingers 29 and hence are directed into the receptacle 8 whose forward end is located adjacent the path of travel of the extreme points of the picker fingers. It will thus be seen in the modification shown in Fig. 3 I have provided a machine which may be operated in substantially the same manner as the modification shown in Figs. 1 and 2 but has incoporated therein certain differences of detailed construction necessary in adapting the link belt or endless chain picking mechanism in place of the drum structure in Figs. 1 and 2.

Having thus described my invention I claim and desire to protect by Letters Patent of the United States:—

1. In a machine of the character described, the combination of a stationary supporting frame, driving wheels mounted on said frame, a rotary frame supplemented by a driving mechanism pivoted on the stationary frame, a berry picking mechanism rotatably supported on said movable frame and means connecting the driving mechanism with the picking mechanism to operate said mechanism.

2. In a machine of the character described, the combination of a stationary supporting frame, driving wheels mounted on said frame, an auxiliary frame, pivoted on said stationary frame, means for securing said auxiliary frame in various positions of adjustment with respect to the stationary frame, a berry picking mechanism supported on the auxiliary frame, a receptacle, and means for operating the picking mechanism from the driving wheels.

3. In a machine of the character described, the combination of means to support a driving mechanism, means to support a berry picking mechanism, a fan mechanism carried by said means, a pair of driving wheels, a berry picking mechanism, means connecting said driving wheels to operate the berry picking mechanism, means connected to the driving mechanism to operate the fan mechanism, the machine operating as means to sever the berries from the vine, separate any foreign matter therefrom and deposit the berries in a suitable receptacle therefor.

4. In a machine of the character described, the combination of a stationary supporting frame, driving mechanism mounted thereon, a pivoted adjustable movable frame on said supporting frame, a berry picking mechansm operated from said driving mechanism, said picking mechanism mounted thereon and comprising a movable carrier structure and a plurality of picker fingers mounted thereon adapted to sever the berries from the vines and retain the same on the movable surface while conveying the berries to a suitable receptacle.

5. In a berry harvesting machine, a supporting mechanism, a berry picking mechanism mounted thereon, a driving mechanism therefor comprising a rotatable member contacted at succeeding points thereof with the ground together with means to transmit the motion of the rotatable member to various points in the berry picking mechanism, a unidirectional clutch between the driving mechanism and picking mechanism whereby the picking mechanism is actuated only when the machine is advanced, and a brake mechanism carried by the supporting means to prevent the picking mechanism from moving in a reverse direction.

6. In a machine of the character described, the combination of a main, relatively stationary frame carrying a driving mechanism and a movable adjustable frame pivoted thereto, a berry picking and blower mechanism carried by said movable frame being thereby adjustable with respect to said stationary frame, a receptacle carried by said main frame, said picking mechanism including means for severing the berries from the vines, carrying the same past the fan mechanism and automatically delivering the same into the receptacle.

7. In a berry picking mechanism, a rotatable combined drum-shaped picking and carrier structure comprising a pair of end plates forming the means for supplying the rotary movement to the picking mechanism, a drum-shaped carrier connecting said end plates, a plurality of sets of curved picker fingers secured to said carrier, retaining guards secured on the surface of the carrier adjacent the picker fingers and end plates, and a berry receptacle located adjacent to and rearwardly of the picking mechanism, the picker fingers operating to sever the berries from the vines and retain the same on the drum-shaped carrier until carried over the drum to a position adjacent the receptacle, the structure being such as to permit berries to then roll on to the upper surface of the adjacent set of fingers ahead and be directed to the berry receptacle by the rearward curved side of said adjacent set of fingers.

8. In a machine of the character described, the combination of a relatively stationary supporting frame provided with a curved slot in the end walls of the frame, driving wheels mounted on the outside of said frame, an auxiliary frame pivoted on the inside of said supporting frame, means for securing said auxiliary frame in various positions with respect to said stationary frame, a berry picking mechanism supported on the auxiliary frame having an operating shaft extending through the slots in said supporting frame, a receptacle, and means for operating the picking mechanism from the driving wheels, comprising a driving means on said wheels and a driven means on the shaft of said picking mechanism.

9. In a machine of the character described, the combination of a stationary supporting frame, driving wheels carried thereby, an auxiliary frame supported by said stationary frame, a rotary picking mechanism carried by the auxiliary frame provided with a driving shaft and a pinion thereon, a rotary fan mechanism carried by said auxiliary frame provided with a driving mechanism, including a shaft and an operating pinion, and driving gears connected to said wheels adapted to mesh with each of said pinions.

10. In a machine of the character described, the combination of a stationary supporting frame, driving wheels located outside of said frame, an auxiliary frame adjustably pivoted on the inside of said supporting frame, a rotary picking mechanism supported on the auxiliary frame provided with a driving shaft and pinion, a rotary fan mechanism supported on the auxiliary frame and provided with operating mechanism, including a shaft and a driving pinion, and gears on said wheels adapted to mesh with said pinions.

11. In a machine of the character described, the combination of a stationary supporting frame, driving wheels mounted on the frame, an auxiliary frame pivoted on said stationary frame provided with a series of openings therein, a pin carried by the outer frame and adapted to be inserted in any one of the openings in the auxiliary frame to thereby adjust the relative position of said frames, a berry picker mechanism carried by the auxiliary frame, a receptacle, and means for operating the picking mechanism from the driving wheels.

In witness whereof, I have hereunto set my hand this 14th day of February, A. D. 1917.

WILLIAM GRIFFIN.

Copies of this patent may be obtained for five cents each, by addressing the "Commissioner of Patents, Washington, D. C."